(12) United States Patent
O'Keefe et al.

(10) Patent No.: US 8,311,985 B2
(45) Date of Patent: Nov. 13, 2012

(54) REMOTE BACKUP AND RESTORE SYSTEM AND METHOD

(75) Inventors: Matthew T. O'Keefe, Mahtomedi, MN (US); Kenneth Preslan, Minneapolis, MN (US)

(73) Assignee: Quest Software, Inc., Aliso Viejo, CA (US)

( * ) Notice: Subject to any disclaimer, the term of this patent is extended or adjusted under 35 U.S.C. 154(b) by 516 days.

(21) Appl. No.: 12/559,156

(22) Filed: Sep. 14, 2009

(65) Prior Publication Data

US 2010/0070476 A1 Mar. 18, 2010

Related U.S. Application Data

(60) Provisional application No. 61/097,446, filed on Sep. 16, 2008.

(51) Int. Cl.
*G06F 17/30* (2006.01)
(52) U.S. Cl. ......... 707/640; 707/822; 711/161; 711/162
(58) Field of Classification Search ................... 707/609, 707/640, 649, 822, 716; 713/176; 705/28, 705/30; 709/201; 711/111, 112, 161, 162; 714/4.11
See application file for complete search history.

(56) References Cited

U.S. PATENT DOCUMENTS

| | | | |
|---|---|---|---|
| 4,309,569 A | 1/1982 | Merkle | |
| 5,819,020 A | 10/1998 | Beeler, Jr. | |
| 5,826,265 A * | 10/1998 | Van Huben et al. | 707/640 |
| 5,974,563 A | 10/1999 | Beeler, Jr. | |
| 5,990,810 A | 11/1999 | Williams | |
| 6,199,074 B1 * | 3/2001 | Kern et al. | 707/640 |
| 6,374,265 B1 * | 4/2002 | Chen et al. | 707/640 |
| 6,401,098 B1 * | 6/2002 | Moulin | 707/802 |
| 6,460,055 B1 * | 10/2002 | Midgley et al. | 707/640 |
| 6,526,418 B1 * | 2/2003 | Midgley et al. | 707/640 |
| 6,625,623 B1 * | 9/2003 | Midgley et al. | 707/640 |
| 6,675,179 B2 * | 1/2004 | Morohashi | 707/640 |
| 6,704,730 B2 | 3/2004 | Moulton et al. | |
| 6,704,755 B2 * | 3/2004 | Midgley et al. | 707/640 |

(Continued)

FOREIGN PATENT DOCUMENTS

WO  WO 00/19337  *  4/2000

OTHER PUBLICATIONS

Patterson, David A., "Computer Architecture a Quantitative Approach", Morgan Kaufmann Publishers, Inc., 1990, (12 pages).

(Continued)

*Primary Examiner* — Shahid Alam
(74) *Attorney, Agent, or Firm* — Knobbe Martens Olson & Bear, LLP

(57) ABSTRACT

A computer-based method includes determining, based at least in part on a quantity of first backup data on a source computer, a data-transfer mode for the first backup data, the data-transfer mode selected from the group consisting of network transfer of the first backup data and physical-media transfer of the first backup data and, responsive to the determining step, transferring the first backup data via the determined data-transfer mode to a server located at a remote destination from the source computer. The physical-media data-transfer mode of the first backup data includes physical transport of physical media to the server. The network-transfer data-transfer mode is accomplished via a network connection and does not include physical transport of physical media.

26 Claims, 2 Drawing Sheets

U.S. PATENT DOCUMENTS

| | | | |
|---|---|---|---|
| 6,847,984 B1* | 1/2005 | Midgley et al. | 707/655 |
| 6,865,655 B1* | 3/2005 | Andersen | 711/162 |
| 6,928,526 B1 | 8/2005 | Zhu et al. | |
| 7,065,619 B1* | 6/2006 | Zhu et al. | 711/162 |
| 7,305,532 B2 | 12/2007 | Zhu et al. | |
| 7,356,535 B2 | 4/2008 | Rothbarth et al. | |
| 7,814,260 B2* | 10/2010 | Chappell et al. | 711/4 |
| 7,870,354 B2* | 1/2011 | Banks | 711/162 |
| 7,913,043 B2* | 3/2011 | Helliker et al. | 711/162 |
| 2003/0120751 A1 | 6/2003 | Husain et al. | |
| 2007/0294321 A1 | 12/2007 | Midgley et al. | |
| 2008/0005141 A1* | 1/2008 | Zheng et al. | 707/803 |
| 2008/0148056 A1 | 6/2008 | Ginter et al. | |
| 2008/0154989 A1 | 6/2008 | Arman | |
| 2010/0057913 A1* | 3/2010 | DeHaan | 709/226 |

OTHER PUBLICATIONS

Folk, Michael J., "File Structures an Object-Oriented Approach with C++", Addison-Wesley, Mar. 1998, (11 pages).

Sleepycat Software, Inc, "Berkeley DB", New Riders Publishing, Jun. 2001, (5 pages).

Lillibridge, M., et al., "Sparse Indexing: Large Scale, Inline Deduplication Using Sampling and Locality", Jan. 14, 2009, (28 pages).

U.S. Appl. No. 12/567,069, O'Keefe.

Brin, Sergey et al., "Copy Detection Mechanisms for Digital Documents", (12 pages).

Tomasic, Anthony et al., "Caching and Database Scaling in Distributed Shared-Nothing Information Retrieval Systems", Proceedings of SIGMOD, 1993, (10 pages).

Manber, Udi, "Finding Similar Files in a Large File System", http://usenix.org/publications/library/proceedings/sf94/full_papers/manber.finding, Oct. 3, 2008, pp. 1-14.

McVoy, L.W. et al., "Extent-like Performance from a UNIX File System", USENIX—Winter 1991, Dallas, TX, pp. 1-11.

Tridgell, Andrew, "Efficient Algorithms for Sorting and Synchronization", A thesis submitted for the degree of Doctor of Philosophy at The Australian National University, Feb. 1999, pp. 1-106.

Eshghi, Kave et al., "A Framework for Analyzing and Improving Content-Based Chunking Algorithms", Hewlett-Packard Development Company, L.P., 2005, pp. 1-10.

Young, Lee W., "International Search Report for PCT/US09/56884" as mailed Nov. 2, 2009, (4 pages).

Young, Lee W., "International Search Report" for PCT/US09/58370, as mailed Nov. 25, 2009 (3 pages).

* cited by examiner

REMOTE BACKUP AND RESTORE SYSTEM AND METHOD

CROSS-REFERENCE TO RELATED APPLICATIONS

This Application claims priority from, and incorporates by reference the entire disclosure of, U.S. Provisional Application 61/097,446 filed on Sep. 16, 2008.

BACKGROUND

1. Technical Field

The present invention relates generally to backup of computer systems and, more particularly, but not by way of limitation, to backup of computer systems utilizing both physical media and network-transfer techniques.

2. History of Related Art

Computer software and data are often stored on disk drives. Since the disk drives and computers incorporating the disk drives can fail, copies of data files, application files, operating-system files, and user data files often must be backed up so that the files can be restored from backed-up file copies if need be. If the backed-up file copies are kept in a remote location, the backed-up file copies can be used to recover disk-drive information in case the disk drive or a computer that includes the disk drive is physically destroyed or otherwise becomes inoperable or unavailable. A process of copying data files, application files, operating-system files, and any other files located on a disk drive, and storing the copied files remotely, is referred to as computer backup. Computer backup may be used to create a disk image. For purposes of this patent application, the term disk image refers to a single file or storage device that contains the complete contents and structure representing a data-storage medium or device, such as, for example, a hard drive, floppy disk, CD, or DVD. A disk image is usually created by creating a complete sector-by-sector copy of a source medium and thereby perfectly replicating the structure and contents of the data-storage medium or device.

Computer backup has historically used external physical media to create a copy of the disk image or copies of files changed since the last time a backup was performed. The term incremental backup is used to refer to a backup of a plurality of backups that includes only those files that have been changed since the most-recent previous backup of any type. In contrast to an incremental backup, the term differential backup refers to a cumulative backup of all files that have been changed since the most-recent previous full backup. The term full backup refers to a backup of an entire data store, regardless of whether or not the data store has been changed since a most-recent previous backup was performed. A full backup results in a complete copy of all data in the data store; however, a full backup is often times consuming and can create many redundant backup files.

Tape media are often used in computer backup. When tape media are used, the tape media can then be transferred to a remote location for safe storage. Such a transfer process is known as tape vaulting. When used for computer backup, tape media has several advantages, including lower cost, increased capacity, and enhanced portability.

Computer networks have become widespread and offer another way to create and transport software and other data to a remote location. Because of the slow transfer speeds of wide area networks (WAN) versus tape media, which are often 2-3 orders of magnitude different, and the significant capital expenditure and operational costs of storing file copies directly on disk, online backup via network transfers has generally been limited to relatively small amounts of critical user data. Complete backup of a computer's hard-disk drive using only network transfers has not been feasible or economically practicable; therefore, network transfers are typically used to protect only a portion of software and other data on a computer. For this reason, a full backup that would permit a bare-metal restore is generally not possible using network-transfer techniques. The term bare-metal restore is used to refer to a technique in which backed-up data is available in a form that allows one to restore a computer system from bare metal, the term bare metal meaning without any requirements as to previously installed software or operating system. In addition, a disk image of a hard drive cannot generally be constructed using purely online backup techniques because certain information such as disk partitions and other non-file-based information required to generate the disk image are often not found in a full backup and also because disk images are very large and transferring them purely over the network is too slow.

Full backup of a computer over WAN has not to date been practical due to rapid data-storage-capacity increases of hard-disk drives compared to bandwidth available on a WAN. Hard-disk drive capacities have been increasing at an annual rate of approximately 100%, which increases have widely outstripped WAN bandwidth increases. For example, typical current hard-disk drives have a data capacity of 1 Terabyte (TB) or more. To transfer 1 TB of data via a 50 kilobyte/second (KB/s) internet upload in a typical U.S. home would take approximately 232 days. Though large corporations often purchase and utilize network connections with much greater bandwidths on private WANs, this bandwidth is very expensive. In addition, corporations that can afford this amount of bandwidth generally have very large amounts of data to back up daily, such as 10's of TB per day).

For purposes of this patent application, a remote computer is a computer that is physically external to a physical computer network. A typical remote computer is a desktop personal computer (PC) located at the home of a corporate employee. A mobile computer is a computer that can change physical location and IP address and can therefore under certain conditions be a remote computer. A remote computer is often referred to as being in the field.

Typical mobile computers include smart phones, personal digital assistants (PDAs), notebook computers, netbook computers, other portable devices capable of accessing the internet via for example, other WIFI or wireless local-area-network connection, and the like. In contrast to mobile computers, a remote computer that is not a mobile computer typically remains in the same physical location and on the same IP subnet.

Management of mobile computers and remote computers poses many problems. Since remote computers and mobile computers are often only infrequently connected to the corporate network, and system-management tasks must generally be executed on systems that reside on a corporate network, execution of the system-management tasks often involves a set of manual, complex, tedious processes across a plurality of separate software packages. A major challenge is consistently executing the system-management tasks on remote computers and on mobile computers that are intermittently connected to a physical network, such as those a corporate network.

Some typical system-management tasks are listed below.

Backup operations on applications, operating-system software, and user data on a mobile computer or remote computer.

Recovering data from, for example, failed hard-disk drives, when no backup is available. In this case, the hard-disk drive must typically be shipped to a data-recovery service such as ONTRACK. The data-recovery services are often expensive and time-consuming and may not recover all data under all circumstances.

Restoring specific files or a complete current backup disk image to a computer.

Installing an operating-system-software image and software applications.

Tracking license usage for software deployed and used on remote computers and mobile computers.

Upgrading software on mobile computers and remote computers in the field.

Tracking license usage for upgraded software on mobile computers and remote computers.

Detection and removal of viruses and other malware, disk tuning and disk de-fragmentation, software tuning, incremental software updates, detection and deletion of sensitive files that are deemed to be impermissible to be stored on a particular mobile computer or remote computer. Examples of files that could be deemed impermissible to be stored on a particular mobile computer or remote computer include files, for example, that: 1) contain objectionable material such as pornography; 2) are unauthorized versions of copyrighted material; 3) contain corporate confidential information such as trade secrets, Board meeting minutes, layoff notices, personnel files or reviews; and 4) contain consumer-related or customer-related private information that, if released outside the corporation, would require the declaration of a data breach.

Migration from old to new mobile-computer or remote-computer hardware that requires migration of existing operating-system software, applications, and user data, and installation of drivers to support the new mobile-computer or remote-computer hardware and any associated devices.

On remote computers and mobile computers, tracking, decommissioning, and properly accounting for inactive software licenses, physical asset decommissioning, and assuring destruction of all corporate files. In particular, mobile-computer software and license inventory are often difficult to manage across a corporate inventory of mobile computers and remote computers.

Disabling mobile computers or remote computers and removing sensitive and corporate files when necessary, including cases where a remote computer or mobile computer is lost or stolen, or the remote computer or mobile computer is no longer being used for corporate purposes, such as use by a former employee.

Performing information-security tasks on mobile computers and remote computers. For example, some data files may contain sensitive corporate information, illegal data files such as unauthorized copies of copyrighted material, objectionable material such as pornography, or perhaps worst of all, private customer information. In the latter case, if the private customer information, such as, for example, social security numbers, credit-card numbers, or health information, is on a mobile computer that is stolen or lost, the private customer information must often be considered under applicable law to have been lost and a data breach declared. Several states now require that consumers be informed in the case of a data breach. Expensive litigation and complex expensive processes to track down and inform consumers of a data breach can cost millions of dollars and significantly impact a corporation's stock value.

SUMMARY OF THE INVENTION

A computer-based method includes determining, based at least in part on a quantity of first backup data on a source computer, a data-transfer mode for the first backup data, the data-transfer mode selected from the group consisting of network transfer of the first backup data and physical-media transfer of the first backup data and, responsive to the determining step, transferring the first backup data via the determined data-transfer mode to a server located at a remote destination from the source computer. The physical-media data-transfer mode of the first backup data includes physical transport of physical media to the server. The network-transfer data-transfer mode is accomplished via a network connection and does not include physical transport of physical media.

A computer-program product that includes a computer-usable medium has computer-readable program code embodied therein. The computer-readable program code is adapted to be executed to implement a data-backup method. The data-backup method includes determining, based at least in part on a quantity of first backup data on a source computer, a data-transfer mode for the first backup data, the data-transfer mode selected from the group consisting of network transfer of the first backup data and physical-media transfer of the first backup data and, responsive to the determining step, transferring the first backup data via the determined data-transfer mode to a server located at a remote destination from the source computer. The physical-media data-transfer mode of the first backup data includes physical transport of physical media to the server. The network-transfer data-transfer mode is accomplished via a network connection and does not include physical transport of physical media.

The above summary of the invention is not intended to represent each embodiment or every aspect of the present invention.

BRIEF DESCRIPTION OF THE DRAWINGS

A more complete understanding of the embodiments of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments of the present invention facilitate a transfer of backup information that combines online backup via computer networks with media transfers in order to accommodate at lower cost large data capacities that are often required for complete backups while concurrently exploiting online backup techniques in order to achieve recovery-point and recovery-time objectives. Potential media include, but are not necessarily limited to, portable hard-disk drives, portable USB-based flash drives, writeable CD or DVD disks, removable tape cartridges, and removable hard-disk drives.

Furthermore, in various embodiments, an available complete hard-drive disk image located, for example, on a virtualization server at a remote data center (i.e., a destination location) permits a virtual machine to be created that mirrors the state of a mobile computer or remote computer when a most-recent previous backup occurred. One or more system-management tasks can be performed on a virtual-machine mirror of the mobile computer or remote computer without disrupting operations on the mobile computer or remote computer, including, but not necessarily limited to, those tasks listed above. The system-management tasks may similarly be performed on a virtual-machine mirror of a computer that is not remote or mobile if a full backup of the computer is available.

Moreover, backup information from a plurality of mobile computers and remote computers including, for example, operating-system files and settings, applications, and user data, may be examined in aggregate, such that a reduced number (e.g., only a single copy) of each unique file or data block is retained, which practice can serve to reduce the bandwidth used during backup operations. In such cases, the virtualization server that executes a backup can check a file or a data-block signature to determine if a copy of the file or data block is already present on the virtualization server; if so, the mobile computer or remote computer may be instructed to skip sending or continuing to send the file or data block to the virtualization server. This process is known as de-duplication. The term de-duplication refers to a process that uses matching logic to eliminate files or data blocks that are duplicates of one another. Criteria for determining when two or more files are duplicates of one another can be predetermined according to design objectives.

In various embodiments, de-duplicated aggregate file and data-block information can support a file-and-text-string search capability to find particular information such as, for example, sensitive corporate documents that have been deemed to not be made available outside a small group of employees, objectionable material, illegal material.

Figure 1:
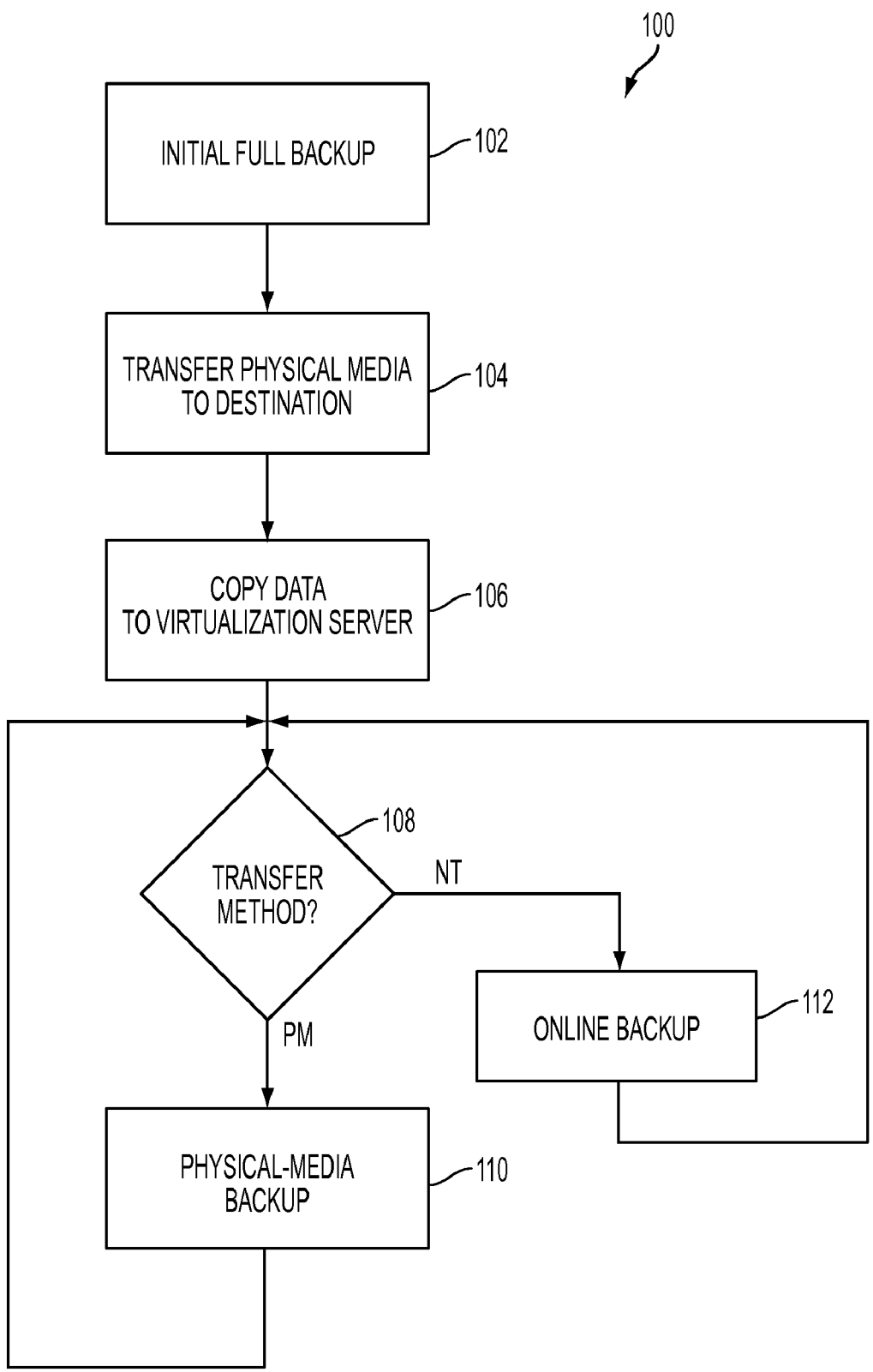
FIG. 1 is a flow chart that describes a backup process in accordance with principles of the invention.

Turning now to the FIGURES, FIG. 1 is a flow chart that describes a backup process. In a flow 100, data backup from a source computer (e.g., a mobile computer or remote computer) can use external physical media shipping from a source location to a destination location. The flow 100 begins at step 102, at which step an initial (i.e., level 0) full backup of the source computer is performed to removable physical media such as a hard disk or tape cartridge. From step 102, execution proceeds to step 104.

At step 104, the removable media is transferred to the destination location, which destination location is remote from the source location. From step 104, execution proceeds to step 106. At step 106, backup data on the removable media is copied at the destination location from the removable media to a virtualization server located at a data center. When the amount of data transferred is large, use of the removable media as described above reduces transfer costs relative to online transfer of the data, provides a mechanism for efficiently completing a level 0 backup and performing fast full restores from disk, permits transfers of a new disk image after system-management tasks have been performed, and facilitates handling of large data transfers required by some incremental backups.

From step 106, execution proceeds to step 108. At step 108, a determination is made after an appropriate interval of time whether to perform a subsequent incremental or differential backup via either another physical media transfer or instead via online via a network transfer. The determination is typically based, at least in part, on the amount of data to be backed up. In some embodiments, the determination may be made based on how much time has passed since a full backup or whether a full backup is deemed to be needed.

If it is determined at step 108 that physical-media transfer should be used, execution proceeds to step 110. If it is determined at step 108 that network transfer should be used, execution proceeds to step 112. At step 110, a physical-media backup occurs. At step 112, a network-transfer backup occurs. From each of steps 110 and 112, execution returns to step 108.

The combination of shipping physical media such as tapes, disks, or other suitable media with incremental or differential online backup via network transfers allows large data transfers to be accomplished with physical-media shipping and subsequent data changes to be transferred conveniently and quickly using computer networks. In another option, media shipping may not be employed. In such cases, purely online backup may be performed. Appropriate logic may be provided to determine under which circumstances media shipping is to be used for a level 0 backup.

In various embodiments of the invention, an exact image of an original hard-disk drive can be generated, the disk image copied onto a removable hard drive, and the removable hard drive physically shipped to a source-computer location where the image can be used to quickly facilitate a restore operation. A bare-metal restore can be used to restore a computer to its state prior, for example, to a disk failure or other disk-loss event such as computer loss, theft, or destruction. A bare-metal restore can also enable a new disk image to be written to an existing disk drive after system-management tasks have been performed.

Figure 2:
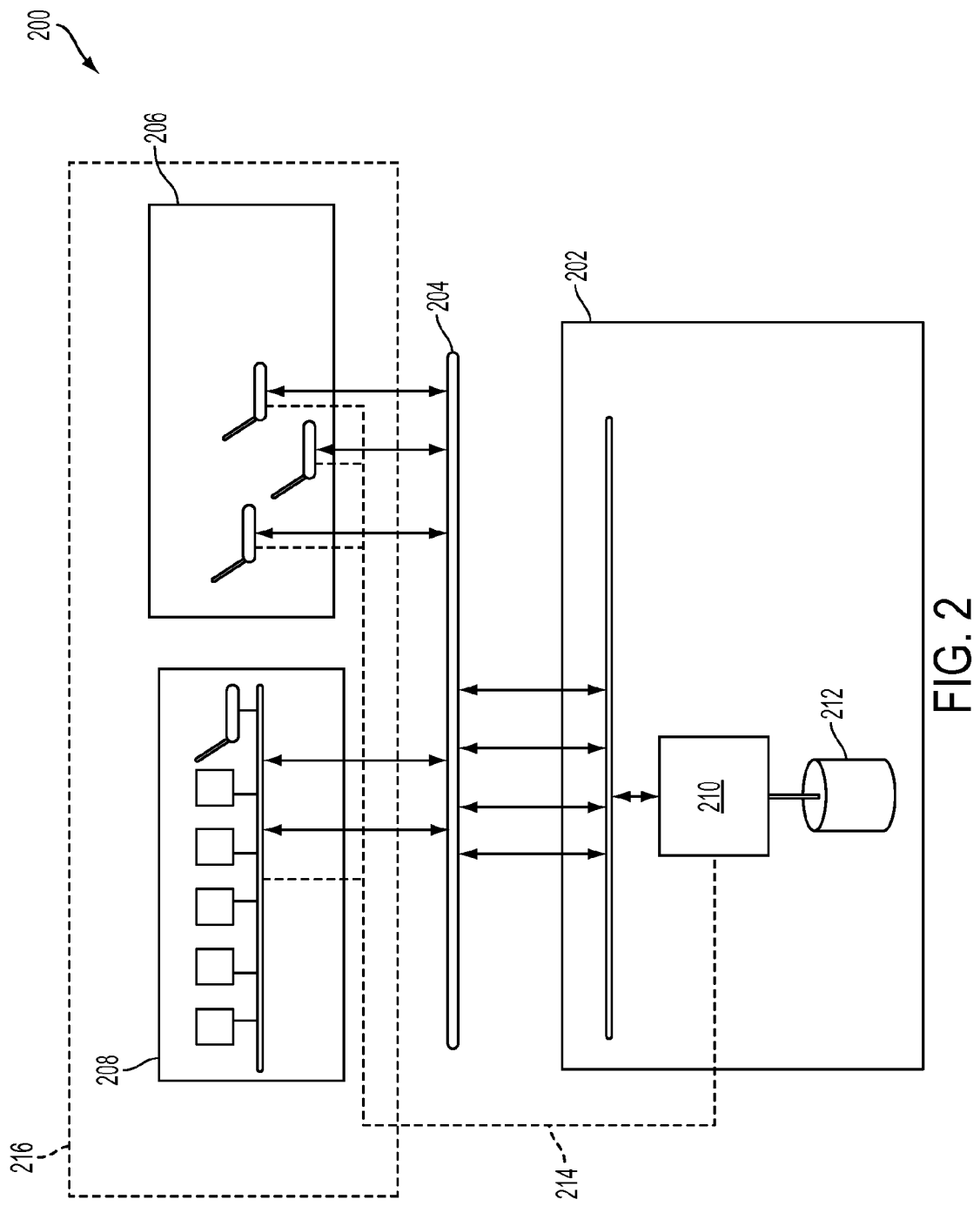
FIG. 2 is a block diagram of an illustrative network architecture and configuration for a system that combines online backups via computer networks with traditional media transfers in accordance with principles of invention.

FIG. 2 is a block diagram illustrating a system in accordance with principles of the invention. A system 200 includes a virtualization server 202 that is connected to a WAN 204. A plurality of remote computers 208 and a plurality of mobile computers 206 are connected to the virtualization server 202 via the WAN 204. The virtualization server 202 includes a server 210 interoperable connected to a database 212. As illustrated, the server 210 is connected to the WAN 204. Also illustrated in the system 200 are a plurality of physical media 214 that can be used to transfer backup data via shipping from one or more of the computers 206, 208 to the virtualization server 202.

Aggregation of backup data from multiple clients (e.g., the plurality of mobile computers 206 or the plurality of remote computers 208) to the virtualization server 202 can be performed as shown in FIG. 2. The plurality of remote computers 208 and the plurality of mobile computers 206 are collectively referred to as a plurality of clients 216. As illustrated, the plurality of clients 216 are in communication with the virtualization server 202. Duplicate files and data blocks that are common between the plurality of clients 216 may be removed by the virtualization server 202 via a de-duplication process that works by identifying identical data segments in different files and storing only a single copy of each segment of unique data, so that storage of redundant data segments in the data store is avoided.

After de-duplication has been completed, the remaining backup data from the clients 216 is typically compressed and encrypted before being transferred from the clients 216 to the virtualization server 202. In a typical embodiment, the clients 216 send data to the virtualization server 202 and the virtualization server 202 determines if data segments from the clients 216 have already been stored at the virtualization server 202. If it is determined by the virtualization server 202 that a particular file or data block from one of the clients 216 has already been transferred via the shipped media 216 to the virtualization server 202, from another of the clients 216, the virtualization server 202 may determine that no transfer is necessary over the WAN 204. Therefore, in response to such a determination, the particular file or data block is not transferred via the WAN 204, which serves to save network bandwidth and make the backup process faster and more efficient. The virtualization server 202 typically accesses a database that contains signatures of the unique data segments the database holds. This database is often referred to as a data-segment-signature database. Both the data-segment-signature database and a backup store are typically contained on a single database, such as the database 212. As new data segments arrive from the clients 216 as part of backup operations, the new data segments are compared by the virtualization server 202 to the data-segment-signature database to determine if the new data segments already exist in the backup store on the database 212. If it is determined that the new data segments do exist on the data-segment-signature database, the client 216 in question is told by the virtualization server 212 not to send the redundant data over the network to the virtualization server 202; if the new segments from the client 216 in question are determined to not exist on the database 212, the new data segments are added to the data-segment-signature database as well as the backup store on the database 212.

The virtualization server 202 can be backed up to external media (e.g., tape cartridges) via, for example, an enterprise backup program such as SYMANTEC NETBACKUP or COMMVAULT GALAXY that is utilized at a data center where the virtualization server 202 resides. In some embodiments, the virtualization server 202 holds complete copies of disk images for all of the remote computers 208 and the mobile computers 206 that are being backed up to the virtualization server 202.

Various embodiments of the invention provide support for a remote office comprising the plurality of mobile computer 206. The remote office can include the plurality of mobile computers 206 as well as a plurality of remote computers (not shown). The remote office can be used to allow mobile computers or remote computers to connect to and coordinate with the virtualization server 202 so that backup data on computers in the remote office can be de-duplicated and compressed before being placed on the virtualization server 202.

Various embodiments of the invention possess the ability to create virtual machines representing the plurality of mobile computers 206 and the plurality of remote computers 208 via virtualization software and complete disk images thereof located on the virtualization server 202. Multiple virtual machines representing external hardware can be created to execute simultaneously and perform system-management tasks.

Via a single representation for all unique segments of data from the clients 216 on the virtualization server 202 of files and data stored across the plurality of mobile computers 206 and the plurality of remote computers 208, each of which backs up to the virtualization server 202, it is possible for the virtualization server 202 to register, track, and destroy sensitive files across the plurality of mobile computers 206 and the plurality of remote computers 208. The virtualization server 202 may instruct backup software on the plurality of mobile computers 206 and the plurality of remote computers 208 to encrypt and, if necessary, destroy files or data responsive to detection of predetermined conditions such as, for example, termination of an employee is fired or loss or theft of a computer.

The single internal de-duplicated representation of files and data stored across the plurality of mobile computers 206 and the plurality of remote computers 208 that is available on the virtualization server 202 can also in some embodiments permit searches for specific information to identify misconduct if necessary and to protect against unauthorized use or release of, for example, sensitive corporate or consumer information. Various embodiments can be used, for example, to allow IT staff to keep files stored on the mobile computer or remote computer encrypted and corresponding data at the virtualization server 202 unencrypted so that de-duplicated and compressed disk-drive data information for the plurality of mobile computers 206 and the plurality of remote computers 208 are maintained. In such an approach, encryption is more practical to deploy because an unencrypted backup copy can be utilized to recover encrypted data in case an encryption key for data on one of the plurality of mobile computers 206 or the plurality of remote computers 208 is lost.

Since the virtualization server 202 can utilize a local copy of a hard-disk image of one of the plurality of mobile computers 206 or the plurality of remote computers 208 to create a virtual-machine mirror of that mobile computer or remote computer, system-management tasks can be performed on the virtual-machine mirror so that use of that mobile computer or remote computer is not disrupted by performance of the system-management tasks. The virtual-machine mirror obviates the need for sustained local access by IT staff to implement the system-management tasks on the mobile computer or remote computer. Instead, operations may be performed on the virtualization server 202. The operations can be processed in parallel on multiple virtual-machine mirrors within a single virtualization server 202 or across a cluster of virtualization servers 202. Complex, tedious, and highly manual processes can be automated within the virtualization server 202 so that IT departments can complete the processes much more quickly with fewer IT staff.

Although various embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A computer-based method comprising:
   determining, based at least in part on a quantity of first backup data on a mobile source computer that is periodically unavailable, a data-transfer mode for the first backup data, the data-transfer mode selected from the group consisting of network transfer of the first backup data and physical-media transfer of the first backup data;
   responsive to determining the data-transfer mode, transferring the first backup data via the determined data-transfer mode to a virtualization server located at a remote destination from the source computer;
   wherein the physical-media data-transfer mode of the first backup data comprises physical transport of physical media to the virtualization server; and
   wherein the network-transfer data-transfer mode is accomplished via a network connection and does not comprise physical transport of physical media;
   creating a virtual machine of the source computer on the virtualization server;
   restoring, via the virtualization server, data of the source computer from the virtual machine; and
   replacing data on the source computer with the data of the source computer restored by the virtualization server such that use of the source computer is not disrupted by the restoring of the data.

2. The computer-based method of claim 1,
   wherein the data-transfer ode is the physical-media transfer; and
   the first backup data is stored from the physical media onto a database coupled to the virtualization server.

3. The computer-based method of claim 2 further comprising, after storing the first backup data:
  determining, based at least in part on a quantity of second backup data, a data-transfer mode for the second backup data, the data-transfer mode selected from the group consisting of network transfer of the second backup data and physical-media transfer of the second backup data;
  wherein the second backup data comprises data on the source computer that changed after transferring the first backup data;
  responsive to determining the data-transfer mode for the second backup data, transferring the second backup data to the virtualization server via the determined data-transfer mode;
  wherein the physical-media data-transfer mode of the second backup data comprises physical transport of physical media to the remote destination from the source computer; and
  wherein the network-transfer data-transfer mode of the second backup data does not comprise physical transport of physical media.

4. The computer-based method of claim 3, wherein the virtualization server tracks sensitive data within at least one of the first backup data and the second backup data.

5. The computer-based method of claim 3, wherein after storing the first backup data, the virtualization server
  performs the steps of claim 3 on a second source computer;
  de-duplicates the second backup data and second backup data of the second source computer resulting from the steps of claim 3 being performed on the second source computer to yield de-duplicated backup data; and
  stores the de-duplicated backup data.

6. The computer-based method of claim 5, wherein the de-duplicated stored backup data is uncompressed.

7. The computer-based method of claim 2 further comprising, after storing the first backup data:
  transferring second backup data on the source computer via the network-transfer data-transfer mode to the virtualization server,
  wherein the second backup data comprises data on the source computer that changed after transferring the first backup data.

8. The computer-based method of claim 7, wherein the virtualization server tracks sensitive data within at least one of the first backup data and the second backup data.

9. The computer-based method of claim 7, wherein after storing the first backup data, the virtualization server
  performs the steps of claim 4 on a second source computer;
  de-duplicates the second backup data and second backup data of the second source computer resulting from the steps of claim 4 being performed on the second source computer to yield de-duplicated backup data; and
  stores the de-duplicated backup data.

10. The computer-based method of claim 2, wherein the virtualization server
  performs the computer-based method of claim 1 on a second source computer;
  de-duplicates the first backup data and backup data on the second source computer to yield de-duplicated backup data; and
  stores the de-duplicated backup data.

11. The computer-based method of claim 10, wherein the de-duplicated stored backup data is uncompressed.

12. The computer-based method of claim 1, further comprising:
  performing, via the virtualization server, at least one system-maintenance task on the virtual machine of the source computer; and
  after performing the at least one system-maintenance task, replacing the data on the source computer with data on the virtual machine changed by the at least one system-maintenance task.

13. The computer-based method of claim 1, wherein the virtualization server tracks sensitive data within the first backup data.

14. A computer-program product comprising a non-transitory computer readable medium storing instructions that cause a processor to execute a data-backup method comprising:
  determining, based at least in part on a quantity of first backup data on a mobile source computer that is periodically unavailable, a data-transfer mode for the first backup data, the data-transfer mode selected from the group consisting of network transfer of the first backup data and physical-media transfer of the first backup data;
  responsive to determining the data-transfer mode, transferring the first backup data via the determined data-transfer mode to a virtualization server located at a remote destination from the source computer;
  wherein the physical-media data-transfer mode of the first backup data comprises physical transport of physical media to the virtualization server; and
  wherein the network-transfer data-transfer mode is accomplished via a network connection and does not comprise physical transport of physical media;
  creating a virtual machine of the source computer on the virtualization server;
  restoring, via the virtualization server, data of the source computer from the virtual machine; and
  replacing data on the source computer with the data of the source computer restored by the virtualization server such that use of the source computer is not disrupted by the restoring of the data.

15. The computer-program product of claim 14,
  wherein the data-transfer mode is the physical-media transfer; and
  the first backup data is stored from the physical media onto a database coupled to the virtualization server.

16. The computer-program product of claim 15, the data-backup method further comprising:
  determining, based at least in part on a quantity of second backup data, a data-transfer mode for the second backup data, the data-transfer mode selected from the group consisting of network transfer of the second backup data and physical-media transfer of the second backup data;
  wherein the second backup data comprises data on the source computer that changed after transferring the first backup data;
  responsive to determining the data-transfer mode for the second backup data, transferring the second backup data to the virtualization server via the determined data-transfer mode;
  wherein the physical-media data-transfer mode of the second backup data comprises physical transport of physical media to the remote destination from the source computer; and
  wherein the network-transfer data-transfer mode of the second backup data does not comprise physical transport of physical media.

17. The computer-program product of claim 16, wherein the virtualization server tracks sensitive data within at least one of the first backup data and the second backup data.

18. The computer-program product of claim 16, wherein, after storing the first backup data, the virtualization server
performs the steps of claim 3 on a second source computer;
de-duplicates the second backup data and second backup data of the second source computer resulting from the steps of claim 3 being performed on the second source computer to yield de-duplicated backup data; and
stores the de-duplicated backup data.

19. The computer-program product of claim 18, wherein the de-duplicated stored backup data is uncompressed.

20. The computer-program product of claim 15, the data-backup method further comprising:
transferring second backup data on the source computer via the network-transfer data-transfer mode to the virtualization server,
wherein the second backup data comprises data on the source computer that changed after transferring the first backup data.

21. The computer-program product of claim 20, wherein the virtualization server tracks sensitive data within at least one of the first backup data and the second backup data.

22. The computer-program product of claim 20, wherein after storing the first backup data, the virtualization server
performs the steps of claim 4 on a second source computer;
de-duplicates the second backup data and second backup data of the second source computer resulting from the steps of claim 4 being performed on the second source computer to yield de-duplicated backup data; and
stores the de-duplicated backup data.

23. The computer-program product of claim 15, wherein the virtualization server
performs the data-backup method of claim 1 on a second source computer;
de-duplicates the first backup data and backup data on the second source computer to yield de-duplicated backup data; and
stores the de-duplicated backup data.

24. The computer-program product of claim 23, wherein the de-duplicated stored backup data is uncompressed.

25. The computer-program product of claim 14, the data-backup method further comprising:
performing, via the virtualization server, at least one system-maintenance task on the virtual machine of the source computer; and
after performing the at least one system-maintenance task, replacing the data on the source computer with data on the virtual machine changed by the at least one system-maintenance task.

26. The computer-program product of claim 14, wherein the virtualization server tracks sensitive data within the first backup data.

\* \* \* \* \*